Sept. 9, 1941.   W. H. BASELT   2,255,728
BRAKE ARRANGEMENT
Original Filed Nov. 18, 1937
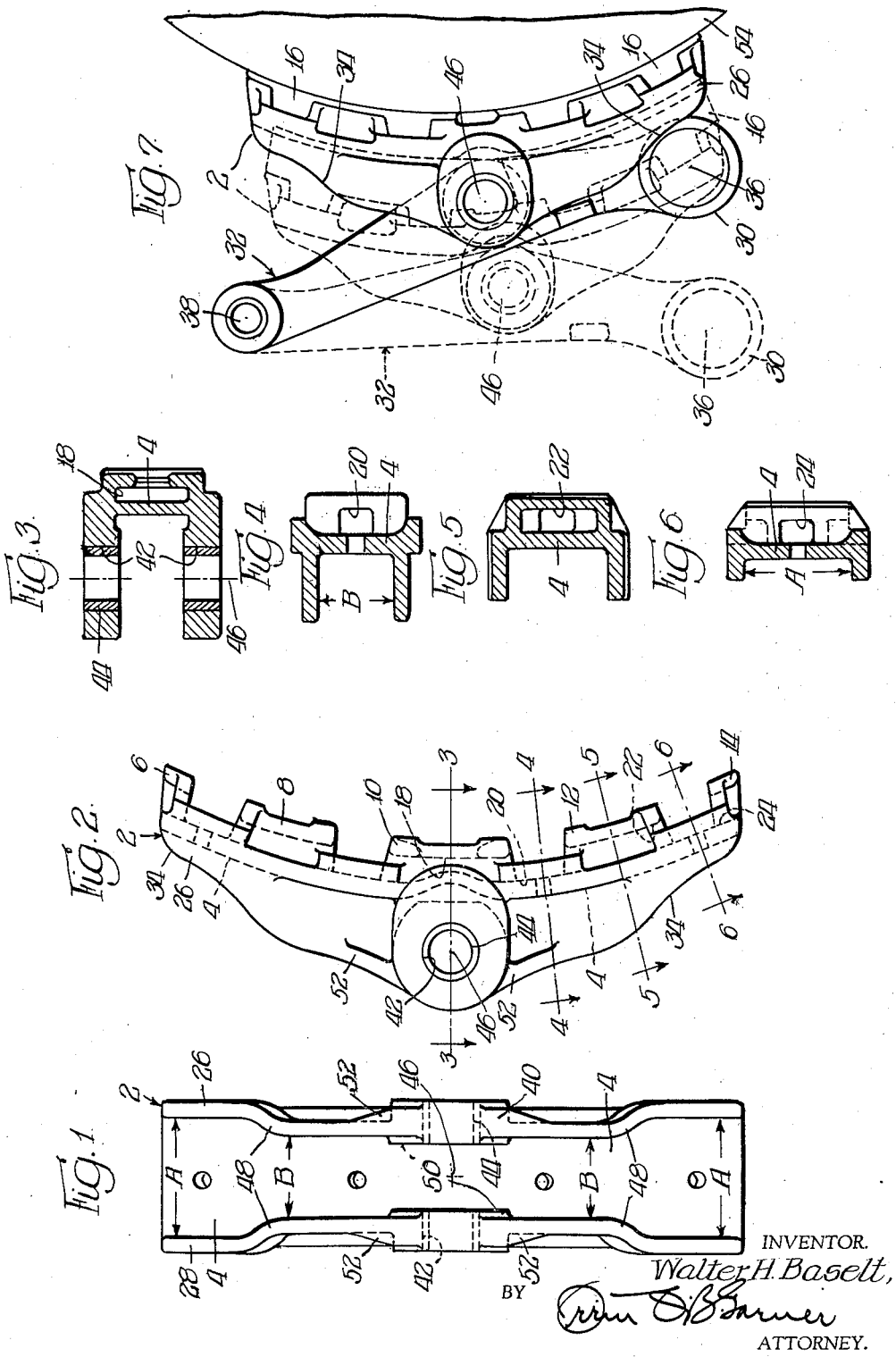
INVENTOR.
Walter H. Baselt,
BY
ATTORNEY.

Patented Sept. 9, 1941

2,255,728

UNITED STATES PATENT OFFICE 2,255,728

BRAKE ARRANGEMENT

Walter H. Baselt, Chicago, Ill., assignor to American Steel Foundries, Chicago, Ill., a corporation of New Jersey Original application November 18, 1937, Serial No. 175,238. Divided and this application October 19, 1939, Serial No. 300,106

10 Claims. (Cl. 188—206)

The subject matter of my invention relates particularly to a novel form of brake head and hanger lever connection as described in more detail hereafter and is divided out of my co-pending application Serial No. 175,238, Brake arrangement, filed in the United States Patent Office on November 18, 1937.

An object of my invention is to design a novel form of hanger lever and associated brake head structure which will facilitate a more compact and space saving arrangement thereof. It comprehends also such an arrangement wherein a brake head is designed to support a plurality of brake shoes.

A different object of my invention is to form a novel structure such as that above described wherein the brake head will be reversible on its supporting hanger lever.

Yet another object of my invention is a novel form of brake head particularly suitable for such an arrangement as that above described and comprising an arcuate center wall supporting brake shoe lugs and spaced arcuate side walls conforming to a greater or less degree to a supporting member enclosed therebetween.

With these and various other objects in view, Figure 1 is a rear elevation of the novel form of brake head associated with the hanger levers of my structure;

Figure 2 is a side elevation of the brake head structure shown in Figure 1;

Figure 3 is a sectional view through the horizontal plane bisecting the head and substantially as indicated by the line 3—3 of Figure 2;

Figures 4, 5 and 6 are sectional views through the novel brake head structure, the several views being taken substantially in the planes respectively indicated by the lines 4—4, 5—5 and 6—6 of Figure 2; and Figure 7 is a fragmentary side elevational view of my novel hanger lever and brake head arrangement showing in full lines the position assumed by the parts when the brakes are applied with worn shoes and wheels and in dotted lines their relative positions when the brakes are released with new shoes and wheels.

My novel form of brake head is shown in detail in Figures 1 to 6 inclusive, and the manner in which the brake head is related to the associated brake hanger is shown in Figure 7. It will be observed that the brake head generally indicated at 2 is of the usual arcuate form having on its front face the conventional arrangement of a series of spaced lugs projecting outwardly from the center wall 4 as indicated at 6, 8, 10, 12 and 14 forming positioning means for the associated brake shoes 16, 16 (Figure 7), said brake shoes being provided with rear lugs having key-way openings of the accustomed type. The key-way openings in the brake heads are aligned with the key-way openings indicated at 18, 20, 22 and 24 in the respective sectional views shown in Figures 3, 4, 5 and 6. In my novel form of structure the plurality of brake shoes may be retained in position by a single key (not shown) passing through the openings in the head and shoes as above described or by a plurality of keys, one for each shoe. It will be further observed that my novel form of brake head has the lateral walls or flanges 26 and 28, said walls being spaced apart a maximum distance A (Figures 1 and 6) adjacent the opposite ends to accommodate the widened lower end 30 of the associated hanger lever generally indicated at 32 which is adapted to accommodate a bushing (not shown) and which may be received between the walls 26 and 28. The walls 26 and 28 are of relatively shallow height at their ends and curved as indicated at 34 to accommodate the enlarged trunnion end of an associated beam normally connected as at 36 at the lower end of the hanger 32. The upper end of said hanger may have a pivotal connection as at 38 with a bracket (not shown) on the frame afforded for that purpose. The said walls 26 and 28 gradually increase in depth to a maximum at the central portion of the brake head as indicated at 40 (Figure 1), and at a central point the said walls are provided with the aligned openings 42, 42 lined with the bushings 44, 44, said openings defining the pivotal point of connection 46 with the brake hanger 32 (Figure 7). The walls 26 and 28 are curved toward each other as indicated at 48 beyond which point they are parallel with each other, providing a somewhat narrower channel therebetween as indicated at B—B, said walls being provided with the centrally located raised bearing pads as indicated at 50. The outer faces of the walls at their top edges are reinforced by the tapering flanges indicated at 52, 52. The manner in which these spaced walls of my novel brake head conform to the lower end of the hanger 32 will be readily apparent from the above description. In other words, the widened portions indicated at A—A at either end of the brake head between the lateral walls thereof afford space for the enlarged end 30 of the hanger 32 so that the said enlarged end of said hanger may be received between said walls as clearly seen in the view of Figure 7. At the same time the tapered structure of said walls, arcuately relieved at 34, 34 as above described, affords clearance for the enlarged trunnion end of the beam at which said hanger has a pivotal connection as at 36.

Figure 7 shows an enlarged view of the brake hanger 32 and the associated brake head 2. The hanger 32 is fulcrumed at its upper end as at 38 and the head 2 is supported intermediate the ends of the hanger as at 46, said hanger being interposed between the lateral walls 26 and 28 as previously described. In Figure 7 the relative positions of the hanger 32 and the head 2 are shown in full lines when the brake shoes 16, 16 in cooperation with the wheel 54 are worn approximately to the point where they will be replaced. In dotted lines I have shown the relative position of these parts with the brakes released and new shoes applied to the brake heads. In other words, the parts are shown in full lines at one extreme of the various positions which may be assumed and they are shown in dotted lines at the other extreme position. It will be seen therefore that when the brakes are applied with worn brake shoes, the enlarged lower end 30 of the hanger 32 is received between the widened portions A—A of the walls 26 and 28, and the depressed portions 34 of these walls accommodate the trunnion end of the associated beam. Those skilled in the art will readily understand that the brake head 2 is reversible, in which case the shallow portion 34 at the opposite end of the head would accommodate the trunnion end of the beam. By this novel arrangement of brake head and associated hanger lever I have provided maximum economy of space and a compact manner of connection which is highly efficient and particularly suitable for the purpose intended.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In brake rigging a hanger lever having an end enlarged to accommodate a bushing, and a reversible brake head pivoted to said hanger and having an end adjacent the aforesaid end of said hanger, said brake head having parallel lateral flanges defining the walls thereof and conforming at each end to the shape of said enlarged end interposed therebetween to accommodate maximum relative angling of said head on said lever.

2. In brake rigging a reversible brake head designed to accommodate a plurality of brake shoes, said brake head having parallel lateral flanges defining the walls thereof, and bushed openings centrally located in said walls defining a pivotal point for connection of said brake head to an associated lever, said flanges defining a channel relatively narrow at the central portion thereof and widened at the ends and being arcuately relieved on their edges adjacent their ends.

3. In brake rigging a hanger lever, and a brake head pivoted thereto intermediate the ends thereof, said brake head having lateral flanges defining a central channel confining said lever, said channel comprising a relatively narrow central portion with relatively high walls and relatively wide end portions with low arcuately relieved walls to accommodate maximum relative angling of said hanger lever and said head.

4. In brake rigging a hanger lever having an enlarged end arranged to accommodate a bushing, and a reversible brake head pivoted to said lever intermediate the ends thereof, said head having parallel lateral flanges defining the walls thereof, said flanges conforming adjacent their ends to the shape of said enlarged end to permit maximum angling of said head on said hanger.

5. In brake rigging a hanger lever, and a reversible brake head pivoted thereto intermediate the ends thereof, said brake head having parallel lateral flanges defining a central channel confining said lever, said channel conforming at each end to the shape of one end of said lever and comprising a relatively narrow central portion and relatively wide end portions, said flanges being arcuately relieved adjacent said wide end portions.

6. In brake rigging a hanger lever, and a brake head pivoted to said lever intermediate the ends thereof, said brake head having lateral flanges defining a central channel therein, said flanges diverging outwardly with concavely relieved edges adjacent the ends thereof to accommodate the enlarged end of said lever.

7. In a brake arrangement a brake head comprising a central arcuate web and spaced lateral flanges having central bosses, aligned openings in said bosses forming a means of connection to an associated brake hanger, said brake hanger having an enlarged end arrangement to accommodate a bushing for connection to an associated brake beam, said lateral flanges having a maximum depth adjacent said bosses and diminishing therefrom along concave curves to a minimum adjacent the ends of said head, whereby maximum angling is permitted of said head on said hanger.

8. In a brake arrangement, a brake head having a central web and parallel lateral flanges with central bosses, aligned openings in said bosses, a brake hanger pivoted in said openings between said flanges, said flanges being arcuately relieved and spaced apart a maximum adjacent the ends thereof to accommodate an enlarged end of said hanger and afford maximum angling movement of said head on said hanger.

9. In a brake arrangement, a reversible brake head having a central web and parallel lateral flanges with central bosses, said flanges forming a channel relatively deep and narrow at its midpoint and relatively wide and shallow at its ends, a brake hanger pivoted in said openings between said flanges and having an enlarged end receivable between said wide and shallow portion of said flanges, the edges of said flanges being arcuately relieved adjacent said ends to form said shallow portion whereby maximum angling is permitted between said head and hanger within a given movement of translation.

10. In a brake arrangement, a reversible brake head comprising an arcuate center wall and parallel lateral flanges with central bosses forming therebetween a channel, a brake hanger pivoted in said channel in aligned openings in said bosses, said channel being of reduced depth with concavely relieved edges on said flanges and of increased width adjacent the ends of said head to accommodate the enlarged end of said hanger and permit maximum angling between said hanger and said head with minimum movement of translation thereof.

WALTER H. BASELT.